United States Patent [19]

Peter et al.

[11] 4,322,445
[45] Mar. 30, 1982

[54] PROCESS FOR DECAFFEINATING COFFEE

[76] Inventors: Siegfried Peter, Lange Zeile 138½, 8520 Erlangen; Gerd Brunner, Weinweg 10, 8541 Eckersmühlen, both of Fed. Rep. of Germany

[21] Appl. No.: 933,482

[22] Filed: Aug. 14, 1978

[51] Int. Cl.³ .............................................. A23F 5/20
[52] U.S. Cl. ................................. 426/312; 426/318; 426/319; 426/427; 426/428; 426/481
[58] Field of Search ............... 426/427, 428, 312, 318, 426/319, 481

[56] References Cited

U.S. PATENT DOCUMENTS

| | | | |
|---|---|---|---|
| 3,806,619 | 4/1974 | Zosel | 426/427 X |
| 3,843,824 | 10/1974 | Roselius et al. | 426/427 X |
| 3,879,569 | 4/1975 | Vitzlium et al. | 426/427 |

FOREIGN PATENT DOCUMENTS

| | | | |
|---|---|---|---|
| 2005293 | 11/1972 | Fed. Rep. of Germany | 426/427 |
| 1057911 | 2/1967 | United Kingdom | 426/427 |

Primary Examiner—Joseph M. Golian
Attorney, Agent, or Firm—Thomas V. Michaelis

[57] ABSTRACT

The invention involves a process for the decaffeination of coffee, wherein—usually moistened—coffee is exposed to a circulating medium essentially composed of a compressed gas and an entrainer; this medium is subjected to partial condensation of the caffeine containing entrainer, in the absence of decompression; the caffeine is recovered from the condensate by evaporation of the entrainer portion thereof, and the medium is recycled to the coffee for continued extraction of caffeine therefrom.

4 Claims, 1 Drawing Figure

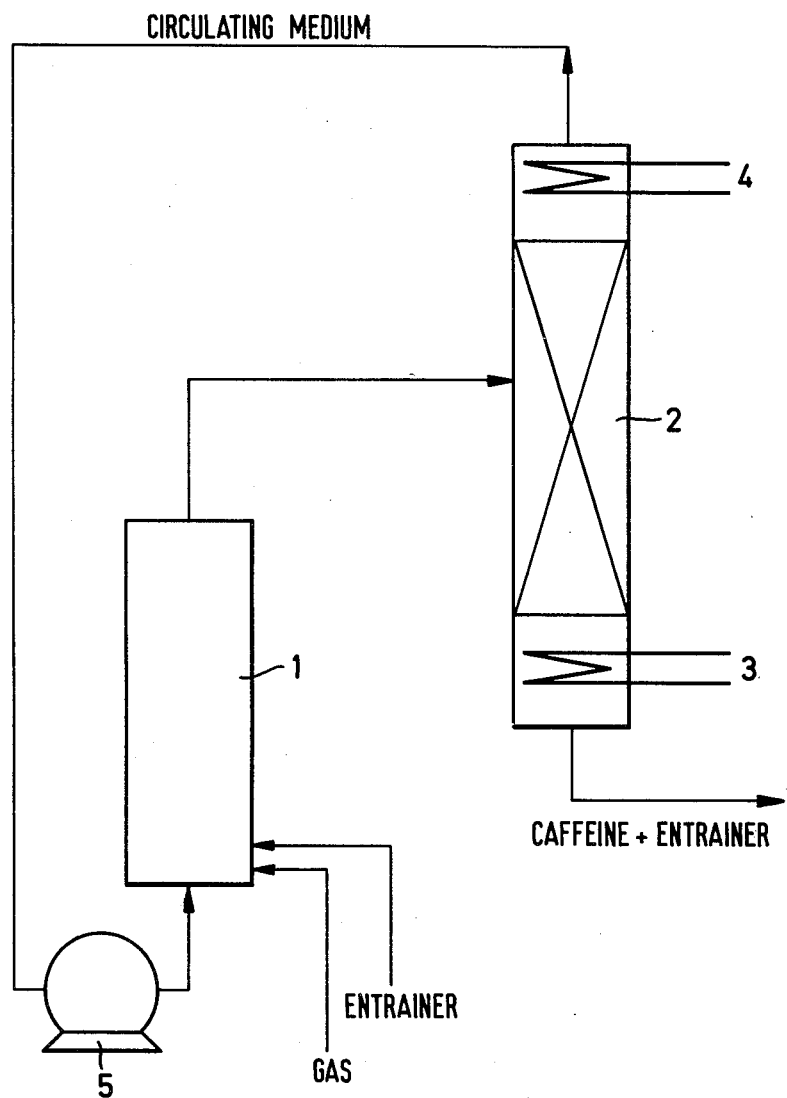

PROCESS FOR DECAFFEINATING COFFEE

BACKGROUND OF THE INVENTION

For the decaffeination of coffee, a fairly large number of processes have been proposed in the past. Many if not most of these processes have in common a pretreatment of the raw coffee with water, followed by a treatment with solvents designed to act as selectively as possible on the caffeine to dissolve and permit the removal of the same. Prime examples of solvents proposed in the prior art are esters, aromatic hydrocarbons and particularly, halogenated hydrocarbons used either by themselves or as mixtures. Also known is the treatment of aqueous extracts of raw or roasted coffee, in counter-current apparatus, e.g. with chlorinated hydrocarbons whereby to remove the caffeine, the aqueous extract free from caffeine being returned to the extracted beans.

The solvent used must be completely removed, at elevated temperature, from the beans and the extracts, a requirement usually met by steaming with water vapor, a procedure which entails technical and analytical complications and expenditure. For this reason, numerous attempts have been made to remove the caffeine from coffee in some other way. Thus, U.S. Pat. No. 1,640,648, for example, proposed a method utilizing the property of caffeine to sublimate at elevated temperatures. In an initial stage of this process, the raw coffee, in order to be liberated from caffeine, is treated with alkaline substances. Subsequently, the raw coffee is heated to 178° C. and while at this temperature, exposed to a current of inert gas passed through it. The caffeine which sublimates at this temperature, is carried away by the gas current. Inert gases proposed include hydrogen, nitrogen and carbon dioxide. This process did not succeed in attaining terminal values below 0.35 percent of caffeine in the raw coffee, with the result that coffee so processed may not be considered to be free from caffeine, or to have a low caffeine content, by the standard set e.g. by German nutritional regulations. Further important drawbacks of this method include exposure of the coffee to alkali, and to high temperatures.

Another process disclosed in (printed German application) DT-AS No. 2,005,293 removes caffeine from moistened raw coffee by means of supercritical, i.e. gaseous carbon dioxide. The preferred range of operation is between 40° C. and 80° C.; the lower limit is the critical temperature of the carbon dioxide. The treatment of the raw coffee at temperatures within this range yields a coffee which when roasted, fails to have a fully satisfying taste.

Further research demonstrated that caffeine may be removed from raw coffee also at temperatures below the critical temperature, by means of liquid carbon dioxide. The decaffeination works with a mixture of liquid and gaseous carbon dioxide as well as with liquid carbon dioxide alone (i.e. at pressures somewhat above the vapor pressure of the liquid carbon dioxide). Under these conditions, however, the dissolving power of the liquid carbon dioxide is not very selective so that in addition to caffeine, other substances are removed from the raw coffee which play an important part in the formation of aroma in the course of roasting. Coffee treated with liquid $CO_2$, therefore, suffers from an inferior aroma.

The properties of liquid carbon dioxide when used as a solvent for caffeine, have been investigated and described a number of times. Thus M. Sivetz, in "Coffee Processing Technology", vol. 2, pp. 21–23, discusses the recovery of coffee aroma oil. In this connection, British Pat. No. 11 06468 and Austrian Pat. No. 2 85 307 may also be mentioned. Similarly, the production of other aroma concentrates by means of liquid carbon dioxide has been described e.g. in "Food Technology" No. 23,11,50 (1969); such aroma concentrates are mixtures of a very large number of components. Thus, in the extraction of raw coffee with liquid carbon dioxide, removal of caffeine is accompanied by the simultaneous removal of other substances. As a result, the caffeine recovered is badly contaminated while the coffee lacks components which have an important influence on the formation of aroma.

A more recent proposal made in DT-AS No. 22 12 281 utilizes the fact that an increase of pressure in the extractor, greatly increases the selectivity of liquid carbon dioxide for caffeine. With pressures above the critical pressure, in particular, the caffeine removed from the coffee is substantially pure, while the content, in the coffee, of substances important for aroma formation, is not noticeably reduced. This process involves treatment of raw coffee with water until a moisture content of from 10 to 60 percent by weight has been obtained, and selective extraction of caffeine with liquid carbon dioxide saturated with water, at a pressure exceeding the critical pressure.

The caffeine so extracted is recovered as a white powder of a purity above 98 percent. Preferably, the extraction is carried out in the temperature range between 0° C. and the critical temperature of the carbon dioxide, and at pressures above 80 bar. The moisture content of the raw coffee is obtained, in known manner, by a steaming preceeding the extraction. The caffeine dissolved in the liquid $CO_2$ is removed in an activated carbon adsorber. The activated carbon, which previously had been saturated with water, adsorbs the dissolved caffeine quantitatively. The solvent is purified and recycled by a pump.

Instead of purifying the circulating medium by means of an activated carbon adsorber, the caffeine may be separated from the solvent also by first conducting the caffeine containing solvent into a separator, for evaporation therein. The vapor is condensed in a cooler and returned by a liquid pump to the extractor. On evaporation the solvent, the caffeine is retained quantitatively in the separator for ready discharge therefrom. Inasmuch as in the course of evaporation in the separator, the carbonic acid suffers from a loss of water, a corresponding volume of water must be added to the carbonic acid before it is returned to the extractor.

BRIEF SUMMARY OF THE INVENTION

The present invention involves a process for the decaffeination of coffee and the recovery of the caffeine wherein from raw coffee pretreated with steam until its moisture content is about 15 to 55 percent by weight, the caffeine is removed by means of a compressed gas and an entrainer, and in an auxiliary column, the caffeine is separated from the circulating gas by partial condensation of the entrainer, in the absence of any decompression, the raw caffeine being recovered from the condensate by evaporation of the entrainer.

DETAILED DESCRIPTION OF THE INVENTION

Thus, the invention utilizes for extraction of the caffeine, a mixture of compressed gaseous and volatile components. It has been found that nitrogen, for example, when placed under pressures above 150 bar, has highly selective solvent characteristics with respect to caffeine. The selectivity of nitrogen, however, is not as great as that of compressed carbon dioxide. Yet, the addition of a suitable volatile solvent or entrainer, very materially increases the solubility of the caffeine in a compressed gas such as nitrogen.

The entrainer dissolves in the compressed gas in an amount corresponding to a multiple of its vapor pressure. It is expedient to add to the compressed gas such a quantity of entrainer that under the prevailing process conditions, it is entirely or almost saturated with the entrainer. A particularly advantageous mode of operation involves a selection of pressure and temperature such that the system of compresses gas and entrainer is supercritical, for in this case it is possible to provide a substantially unlimited concentration of entrainer in the gas phase. In this manner, at the same time a high solubility of the caffeine is obtained.

In order to separate the caffeine dissolved in the mixture of compressed gas and entrainer, the compressed gas, at constant pressure, is either heated or cooled, dependent on whether the saturation concentration of the entrainer in the compressed gas rises or falls with the temperature. Both cases are possible. In accordance with the invention, this process step is designed to condense part of the entrainer. At the same time, the condensed part of the entrainer serves the purpose of washing the caffeine out of the circulating compressed gas. If by an appropriate choice of temperature, the condensed portion of the entrainer is kept small, relatively concentrated solutions of caffeine are obtained from which pure caffeine is readily recovered.

If for the extraction, conditions are so selected that the mixture of compresses gas and entrainer is supercritical, for the separation of the caffeine a temperature is chosen which will render the mixture of compressed gas and entrainer subcritical. Usually, this is accomplished by an increase of temperature.

In the drawing accompanying this specification, an embodiment of apparatus suitable for carrying out the process of the invention, is illustrated diagrammatically by way of example.

In the drawing (wherein FIG. 1 is the sole FIGURE). a pressure vessel 1 is shown which serves as the extractor; here the coffee is brought into intimate contact with a mixture of compressed gas and entrainer. As a result, the mixture of compressed gas and entrainer is charged with caffeine. Once it has passed the extractor, the circulating medium enters the column 2. At the head of this column, a heat exchanger 4 is located which is designed to condense part of the entrainer. The condensed entrainer descends in the column 2 in counter-current relative to the circulating medium, and in the course of its descent, washes out the caffeine dissolved in the circulating medium. The sump of column 2 accomodates the heat exchanger 3 which may serve the purpose of concentrating the caffeine solution by partial evaporation of the solvent. The entrainer charged with caffeine, which contains dissolved the equilibrium quantity of compressed gas, is discharged at the sump of column 2. Column 2 may be a plate column or a packed column.

The circulating medium freed from caffeine in column 2, is returned, by the circulation gas pump 5, to the extractor 1 wherein it is recharged with caffeine. The losses in compressed gas and entrainer, caused by the withdrawal of the caffeine solution, are replaced by the addition of gas and entrainer to the extractor.

Once the caffeine content of the raw coffee in the extractor has dropped to the desired value, pressure in the extractor is removed and the extractor emptied. The charging and discharging of the extractor, however, may also be effected by means of pressure gates in the absence of decompression of the extractor contents, in known manner. The charging and discharging of a pressure container filled with solid material by means of gates is a known procedure used, for example, in the gasification of solid fuels in stationary beds.

Entrainers contemplated by the invention are, for example, chlorinated hydrocarbons, in particular, chlorinated alkanes, preferably those having from 1 to 2 carbon atoms and from 1 to 4 chlorine atoms in the molecule, as e.g. methylenechloride, dichlorethylene and trichlorethylene.

In another embodiment of the invention, solvents contemplated include esters, preferably those of aliphatic acids, such as fatty acids having from 2 to 4 carbon atoms, with aliphatic alcohols, preferably those with from 1 to 3 carbon atoms. Good results, however, were also obtained when using corresponding esters of aliphatic dicarboxylic acids having from 3 to 4 carbon atoms, or else esters of aceto-acetic acid. Examples are: methylacetate, ethylacetate, propylacetate, ethylpropionate, malonic acid dimethylester and aceto-acetic acid methylester.

Still another embodiment of the invention contemplates, as solvents, ketones having from 3 to 6 carbon atoms, such as acetone, methylethylketone, and acetylacetone.

Solvents particularly preferred for purposes of the invention are aliphatic alcohols, preferably those having up to 3 carbon atoms such as methylalcohol, ethylalcohol, isopropylalcohol, as well as formaldehyde dimethylacetal. If formaldehyde dimethylacetal is used, it is preferably saturated with water. The solubility of water in formaldehyde dimethylacetal, at 20° C., amounts to about 11.5 percent by weight, and at 40° C., to about 14.9 percent by weight.

It is expedient to pretreat the raw coffee to be extracted by the process of this invention, prior to the extraction, by steaming so as to obtain a moisture content between 5 and 55 percent by weight, as is usual for processes of caffeine extraction.

For use as entrainers, solvents are preferred to which water has been added in a quantity such that the binary supercritical mixture of gas and entrainer is saturated with water vapor. Inasmuch as in the column wherein the caffeine is separated, relatively more water condenses than solvent, it is necessary to supply quantities of water and solvent corresponding to the respective losses of either, to the circulating medium after it has passed through the column.

The temperature at which the raw coffee is treated in accordance with the invention, may very between about 0° C. and 100° C. Preferred, however, are temperatures between about 20° C. and 45° C. At temperatures roughly corresponding to room temperature, the raw coffee remains substantially unchanged even over very long periods of treatment, e.g. for 3 days.

In addition to nitrogen, the invention contemplates the use of other compressed gases, such as carbon dioxide, nitrous oxide, ethane, ethylene, methane, propane, propylene, and monochlorotrifluoromethane.

The working pressures used in the extraction may very within wide limits. Nevertheless, with gases having a low critical temperatures, such as nitrogen and methane, higher pressures in the range from about 150 to about 1000 bar, and preferably from about 150 to about 500 bar, should be selected. If as the compressed gases according to the invention, gases are used the critical temperature of which is near or within the temperature range from about 0° C. to 100° C., the working pressures will exceed the respective critical pressures. In the latter case, generally speaking, a somewhat lower pressure of up to about 200 bar will suffice. Thus, the pressure range of $CO_2$ is situated between about 75 and about 200 bar, that of nitrous oxide between about 72 and about 200 bar, that of ethane between about 50 and about 200 bar, that of ethylene between about 51 and about 200 bar, that of propane between about 40 and about 200 bar, that of propylene between about 45 and about 200 bar, and that of monochlorotrifluoromethane between about 40 and about 200 bar.

The invention may be further illustrated by the following examples which are intended to more fully explain the invention rather than to limit it beyond the scope of the claims.

EXAMPLE 1

In apparatus corresponding to FIG. 1 of the drawing, 0.5 kg of raw coffee pretreated to have a moisture content of 46 percent by weight, are treated, at a temperature of 40° C. and at a pressure of 200 bar, for 14 hours, with nitrogen and formaldehyde dimethylacetal; the nitrogen contained about 3 percent by weight of formaldehyde dimethylacetal. The circulating gas composed of nitrogen and formaldehyde dimethylacetal was saturated with water vapor. In the auxiliary column, the circulation gas was cooled to 20° C. The mixture of water and fromaldehyde dimethylacetal which condensed due to the cooling of the circulating medium, contained, in solution, the extracted caffeine. At the end of the extraction procedure it was found that the caffeine content of the raw coffee had been reduced to 0.07 percent by weight.

EXAMPLE 2

In apparatus according to FIG. 1, 0.5 kg of raw coffee with a moisture content of 50 percent by weight, were treated, at 45° C. and at a pressure of 90 bar, for 14 hours, with carbon dioxide and formaldehyde dimethylacetal, the formaldehyde dimethylacetal being contained in the carbon dioxide in an amount of 17 percent by weight of the carbon dioxide. The circulating gas composed of carbon dioxide and formaldehyde dimethylacetal was saturated with water vapor. In the auxiliary column, the circulating gas was heated to 80° C. The mixture of formaldehyde dimethylacetal and water which condensed, contained dissolved in it, the caffeine extracted. The extraction process resulted in a lowering of the caffeine content of the raw coffee, to 0.06 percent by weight.

We wish it to be understood that we do not desire to be limited to the details of process and apparatus described in the specification and shown in the drawing, as modifications within the scope of the claims and not departing from the spirit of the invention, may readily occur to those skilled in the art.

We claim:

1. A process for decaffeination of coffee and recovery of caffeine, comprising pretreating the raw coffee with steam until its moisture content is from 15 to 55 percent by weight of the raw coffee, exposing the raw coffee thus pretreated to a circulating medium essentially composed of a compressed gas selected from the group consisting of nitrogen, carbon dioxide, nitrous oxide, ethane, ethylene, methane, propane, propylene and monochlorotrifluoromethane, and an entrainer for extraction of caffeine selected from the group consisting of chlorinated alkanes having from 1 to 2 carbon atoms and from 1 to 4 chlorine atoms, esters of an aliphatic acid having from 2 to 4 carbon atoms with an aliphatic alcohol having from 1 to 3 carbon atoms, esters of an aliphatic dicarboxylic acid having from 3 to 4 carbon atoms, esters of aceto-acetic acid, ketones having from 3 to 6 carbon atoms, aliphatic alcohols having up to 3 carbon atoms, and formaldehyde dimethylacetal, subjecting said circulating medium to partial condensation of the caffeine containing entrainer, in the absence of decompression, recovering caffeine from the condensate by evaporation of the entrainer contained therein, and recycling the circulating medium to the raw coffee for continued extraction of caffeine therefrom.

2. The process according to claim 1, including the step of saturating the circulating medium composed of compressed gas and entrainer, with water.

3. The process according to claim 2, including the step of adding entrainer and water to the circulating medium following the condensation, to make up for the loss of entrainer and water by said condensation.

4. The process according to claim 3, including the step of maintaining the temperature during extraction of the raw coffee, at about from 20° C. to 45° C.

* * * * *